United States Patent

Chen et al.

[11] Patent Number: 5,878,206
[45] Date of Patent: Mar. 2, 1999

[54] COMMIT SCOPE CONTROL IN HIERARCHICAL INFORMATION PROCESSES

[75] Inventors: Qiming Chen, Sunnyvale; Umeshwar Dayal, Saratoga, both of Calif.

[73] Assignee: Hewlett-Packard Company, Palo Alto, Calif.

[21] Appl. No.: 823,704

[22] Filed: Mar. 25, 1997

[51] Int. Cl.⁶ .............................. G06F 11/14; G06F 17/30
[52] U.S. Cl. .................. 395/182.17; 707/10; 707/202; 707/203
[58] Field of Search .................. 395/182.13, 182.14, 395/182.17, 182.18; 707/201, 202, 203, 10

[56] References Cited

U.S. PATENT DOCUMENTS

| | | | |
|---|---|---|---|
| 5,287,501 | 2/1994 | Lomet | 707/202 |
| 5,432,926 | 7/1995 | Citron et al. | 395/182.02 |
| 5,506,983 | 4/1996 | Atkinson et al. | 707/1 |

*Primary Examiner*—Ayaz R. Sheikh
*Assistant Examiner*—Sumati Lefkowitz

[57] ABSTRACT

An information system that enables a child transaction to broaden the visibility of its data updates to a wider scope than the scope of its parent transaction thereby enhancing concurrency but without sacrificing protection in that scope. The information system provides scoped transactions and provides failure handling in hierarchical information processes that contain scoped transactions.

18 Claims, 7 Drawing Sheets

COMMIT SCOPE CONTROL IN HIERARCHICAL INFORMATION PROCESSES

BACKGROUND OF THE INVENTION

1. Field of Invention

The present invention pertains to the field of information systems. More particularly, this invention relates to commit scope control in hierarchical information processes.

2. Art Background

Information systems are commonly employed in a variety of business-related and other applications. Such information systems typically include information stores such as database management systems and one or more information processes that manipulate data which is persistently stored in the databases. Such information processes may also be referred to as applications.

An information process may be arranged as a hierarchy of nested transactions. Such a nested transaction hierarchy may be arranged as a closed hierarchy that strictly enforces atomicity at each level. Alternatively, such a nested transaction hierarchy may be arranged as an open hierarchy with relaxed atomicity controls at particular levels.

Figure 1:
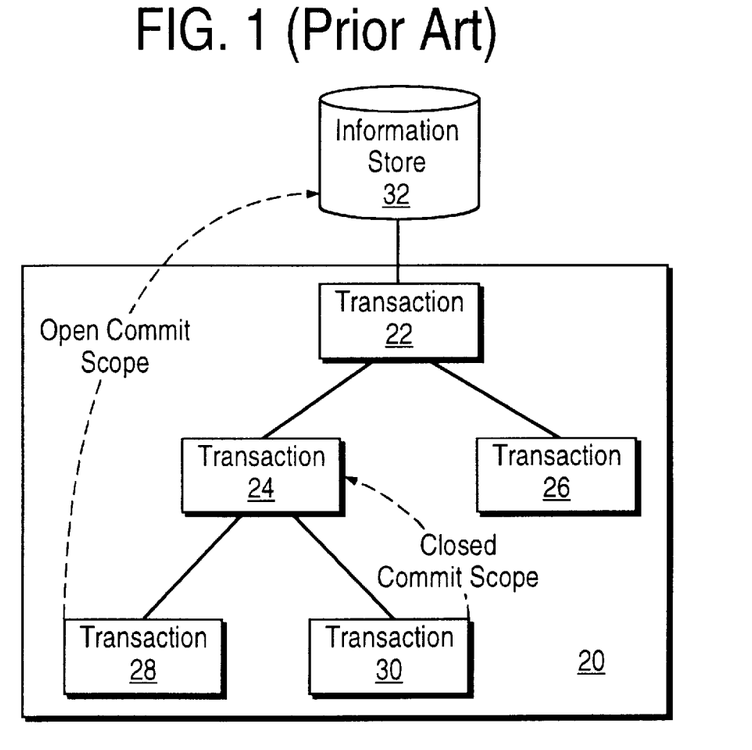
FIG. 1 illustrates an information process which is arranged as a hierarchy of nested transactions.

FIG. 1 illustrates an information process 20 which is arranged as a hierarchy of nested transactions 22–30. The transaction 22 is at a top level or root of the hierarchy. The transaction 22 spawns the transactions 24 and 26. The transaction 22 is referred to as the parent of the transactions 24 and 26, and the transactions 24 and 26 are each referred to as a child transaction or a sub-transaction of the transaction 22. The transaction 24 is a root of a corresponding sub-tree in the hierarchy.

Typically, transactions 24 and 26 each generate a corresponding set of data updates which are targeted for an information store 32. The data updates generated by the transactions 24 and 26 may also be referred to as the effects of the transactions 24 and 26 or the results of the transactions 24 and 26.

The child transactions 24 and 26 make their respective data updates visible to their parent transaction 22 upon their completion. The act of a child transaction making its data updates visible to its parent is referred to as committing to its parent. Transactions that commit to their parent are usually referred to as closed transactions. In other words, the commit scope of a closed child transaction is its parent.

The transaction 24 is the parent of the transactions 28 and 30. The child transactions 28 and 30 are usually closed transactions that commit to their parent transaction 24 upon their completion. Typically, the transaction 24 commits to its parent transaction 22 only after both of its child transactions 28 and 30 have completed. The transaction 22 usually commits to the information store 32 only after both of its child transactions 24 and 26 have completed.

Typically, the transaction 22 commits all accumulated data updates to the information store 32 as a single atomic transaction thereby making the data updates visible to all transactions. Such an "atomic" transaction usually ensures that the interrelated data updates generated by the transactions 22–30 are either all made visible or none are made visible in the information store 32 should a system failure occur.

Such a closed nested transaction hierarchy typically provides strict enforcement of atomicity at each level of the hierarchy because the only possible commit scope of a child transaction is its parent. Unfortunately, such a closed nested hierarchy usually sacrifices data concurrency in the hierarchy.

For example, the transaction 30 may have an extended duration that involves extended user interaction. As a consequence, the transaction 30 may require a relatively long time to complete. The transaction 28, on the other hand, may complete relatively quickly. In addition, the transaction 26 may have a need for the data updates generated by the transaction 28.

The transaction 28 being a closed transaction commits to its parent transaction 24 upon its relatively quick completion. The data updates generated by the transaction 28 are then held by the transaction 24 until the extended duration transaction 30 has completed because the transaction 24 usually cannot commit to its parent transaction 22 until all its children have completed. Unfortunately, such a hold up of data updates generated by the transaction 28 can excessively delay the transaction 26 which requires those data updates even though the transaction 28 had completed relatively quickly.

One prior technique for making the data updates of a child transaction available to other transactions prior to the completion of its parent is to allow the child transaction to commit its data updates to an information store directly. A child transaction that commits directly to an information store is referred to as an open child transaction. It is said that such an open child transaction has an open commit scope. For example, the transaction 28 having an open commit scope upon completion commits to the information store 32 thereby making its data updates immediately visible to the transaction 26.

Unfortunately, such direct updates of an information store by open child transactions usually sacrifices the data integrity controls which are provided by a closed hierarchy. For example, a system failure that occurs after the transaction 28 commits to the information store 32 but before the transaction 22 commits to the information store 32 can result in inconsistent data updates being visible in the information store 32.

In summary, a transaction hierarchy that includes open transactions with open commit scopes usually improves concurrency by allowing the data updates of open transactions to be more widely visible upon their completion. Unfortunately, such open hierarchies usually sacrifice the data integrity protections provided by closed hierarchies which enforce atomicity at each level.

SUMMARY OF THE INVENTION

An information system is disclosed that enables a child transaction to broaden the visibility of its data updates to a wider scope than the scope of its parent transaction thereby enhancing concurrency but without sacrificing protection in that scope. The information system enables a child transaction in a nested transaction hierarchy to commit to a selected one of its ancestors independently of its parent transaction and thereby make its data updates visible to that ancestor as well as the transactions beneath that ancestor in the transaction hierarchy.

The information system includes mechanisms for transaction recovery that handle failures in a transaction hierarchy having transactions with mixed commit scopes. A scoped undo process is disclosed that partially and consistently rolls back a transaction hierarchy upon failure, then restarts and rolls the transaction hierarchy forward.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 2:
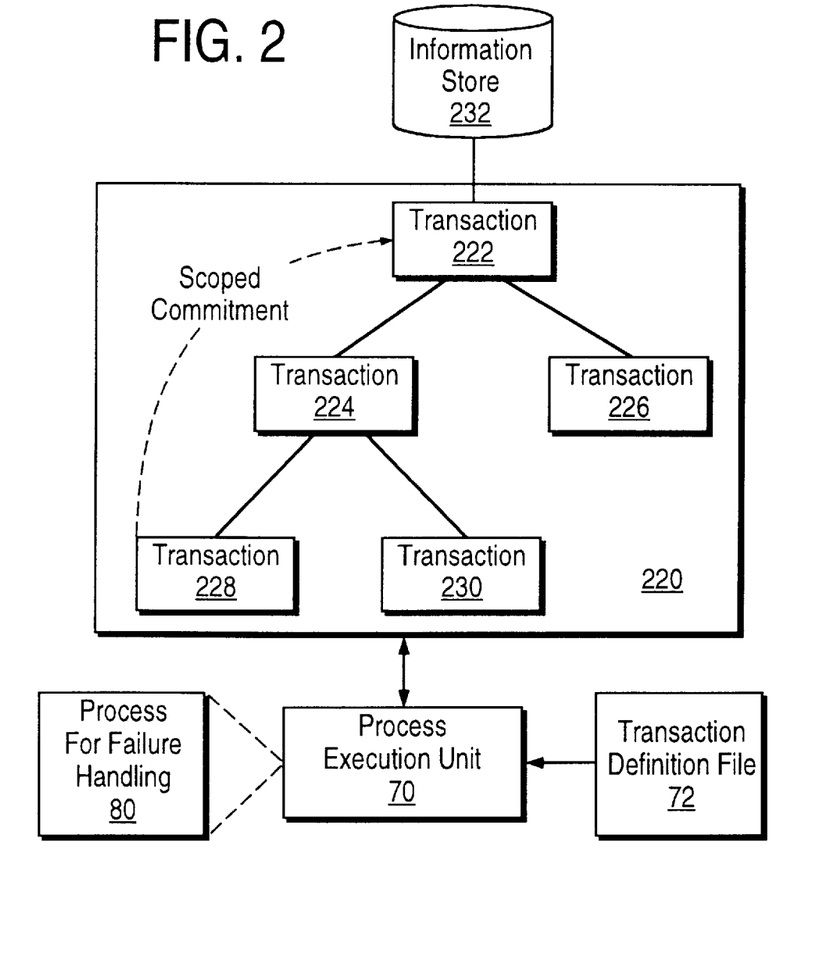
FIG. 2 illustrates one embodiment of an information system that enables a child transaction to broaden the visibility of its data updates to a wider scope than the scope of its parent by committing its data updates to one of its ancestors independently of its parent.

FIG. 2 illustrates one embodiment an information system that enables a child transaction to broaden the visibility of its data updates to a wider scope than the scope of its parent transaction by committing its updates to one of its ancestors independently of its parent transaction. These types of child transactions are also referred to as scoped transactions. The information system includes an information process 220, a process execution unit 70 and a transaction definition file 72.

The information process 220 is arranged as a hierarchy of nested transactions 222–230. The information process 220 conducts information processing functions and stores persistent data in an information store 232. In one embodiment, the information store 232 is a relational database management system. In other embodiments, the information store 232 may be another type of database systems or a conventional file system.

The transaction definition file 72 contains specifications that define the hierarchy of nested transactions 222–230 of the information process 220 including information that specifies the commit scopes of the transactions 222–230. The process execution unit 70 creates and manages the transactions 222–230 according to the specifications provided in the transaction definition file 72.

The transaction definition file 72 specifies that the commit scope of the transaction 228 is its ancestor transaction 222. As a consequence, the process execution unit 70 commits the data updates of the transaction 228 to the transaction 222 upon completion of the transaction 228.

The commitment of data updates by a child transaction to its ancestor transaction is referred to as scoped commitment. A child transaction that employs scoped commitment is said to commit over its parent directly to its ancestor and have a commit scope to its ancestor.

The scoped commitment by the transaction 228 to its ancestor transaction 222 makes the data updates of the transaction 228 visible to the transaction 226 before the completion of the transaction 224 while keeping the data updates of the transaction 228 internal to the transaction 222 until the transaction 222 completes.

In one embodiment, the process 220 is a software development process wherein the transaction 230 is a long duration coding transaction and the transaction 228 is a relatively brief function design transaction and the transaction 226 is an interface development transaction that uses data updates generated by the transaction 228. The scoped commitment by the transaction 228 to the transaction 222 makes its function design data updates visible to the interface development transaction 226 before the completion of the transaction 224. The scoped commitment avoids delays to the interface development transaction 226 that otherwise would have been caused by the long duration coding transaction 30.

The process execution unit 70 provides a set of routines or functions for creating and managing the hierarchical transactions of the information process 222. The process execution unit 70 includes a start-transaction routine that starts up individual transactions and a complete-transaction routine for properly handling the completion of individual transactions. The process execution unit 70 also includes an abort-transaction routine that implements a process for failure handling 80 for handling transaction failures when scoped transactions are involved.

The transaction definition file 72 contains a set of transaction specifications for each of the transactions 222–230. Each set of transaction specifications includes an identification of an access set associated with the corresponding transaction, an identification of an optional compensation transaction for the corresponding transaction, an identification of an optional contingency transaction for the corresponding transaction, a specification of the commit scope of the corresponding transaction, and a specification of the vitalness of the transaction to its parent.

For example, the transaction specifications contained in the transaction definition file 72 for the transaction 228 are shown below.

| Access Set Identifier | data objects inherited from transaction 224 and data objects obtained directly from an information store |
|---|---|
| Compensation Transaction | optional |
| Contingency Transaction | optional |
| Commit Scope | transaction 222 |
| Vitalness to Parent | vital |

The access set of a transaction in the information process 220 include data objects obtained directly by the transaction or data objects inherited by the transaction. For example, the access set for the transaction 228 includes data objects obtained from an information store and data objects inherited from its parent transaction 224. If objects inherited by a transaction are held by an ancestor of its parent transaction, then a two-step inheritance operation is performed. For example, the access set of the transaction 228 may include data objects acquired by the transaction 222 from the information store 32 which are then inherited by the transaction 224 and then inherited by the transaction 228.

The data objects visible to a child transaction in the process 220 during its execution are referred to as the visibility set of the child transaction. The data objects on which a child transaction may have operational conflicts with other transactions is referred to as the conflict set of the child transaction. Two transaction are said to have an operational conflict if different orders of their executions result in different data update states.

In response to the specifications in the transaction definition file 72, the complete-transaction routine of the process execution unit 70 commits the data updates of the transaction 228 over its parent transaction 224 to its ancestor transaction 222 by delegating to the ancestor transaction 222 the commit/abort responsibility on the entire access set of the transaction 228. The ancestor transaction 222 is referred to as the commit scope of the transaction 228.

The process execution unit 70 manages the information process 220 such that the objects held by the transaction 222 are visible to its descendants. In general, a transaction can access without conflicts any data object currently accessed by one of its ancestors, i.e. its parent or its grand-parent etc. Therefore, the transaction 226 can access the data objects committed by the scoped transaction 228 to the transaction 222. The scoped commit of the transaction 228 makes its effects visible to the transaction 226 immediately without being blocked by a long duration sibling transaction such as the transaction 230. The data updates of the transaction 228 are not made persistent and are inaccessible to other top-level transactions until the process 220 completes wherein the complete-transaction routine of the process execution unit 70 commits the data updates of the transaction 222 to the information store 232.

The transactions 222–230, the information store 232, and the process execution unit 70 are software elements that may be implemented in a variety of hardware environments. These software elements may execute on a single computer system or may be distributed across a number of computer systems. For example, the transactions 222–228 may execute on one computer system and the transaction 230 my execute on a separate computer system. These computer systems may be connected via a local area network or another type of network including networks that conform to Internet communication protocols.

Figure 3:
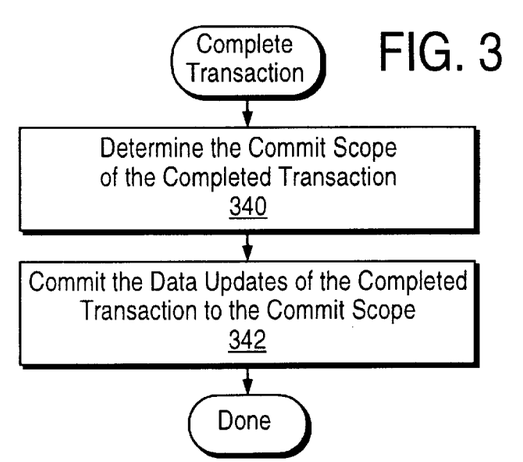
FIG. 3 illustrates the complete-transaction routine in the process execution unit.

FIG. 3 illustrates the complete-transaction routine in the process execution unit 70 which is performed upon completion of each of the transactions 222–230. At step 340, the complete-transaction routine determines the commit scope of the transaction being completed. The commit scope of the transaction being completed is indicated in the transaction definition file 72.

At step 342, the complete-transaction routine commits the data updates of the transaction being completed to the commit scope determined at step 340. The complete-transaction routine commits the data updates to the commit scope by delegating the commit/abort responsibility on the entire access set of the transaction being completed to the commit scope transaction.

Figure 4:
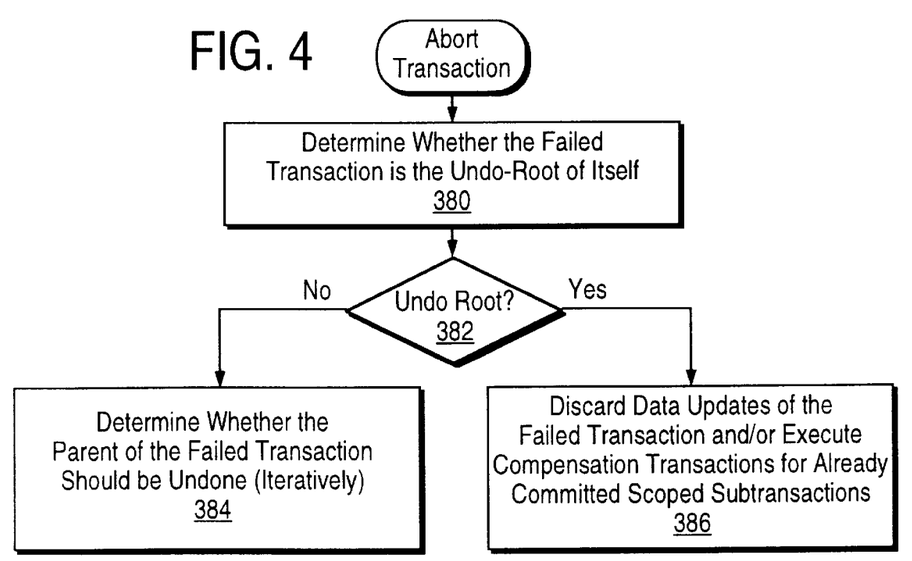
FIG. 4 illustrates the abort-transaction routine in the process execution unit.

FIG. 4 illustrates the abort-transaction routine in the process execution unit 70 which is performed when one of the transactions 222–230 fails. At step 380, the abort-transaction routine determines whether the failed transaction is the undo-root of itself. If so then control proceeds to step 386. At step 386, the data updates generated by the failed transaction are discarded. At step 386, optional compensation transactions are executed to compensate for any scoped sub-transactions of the failed transaction that have already committed their data updates.

If the failed transaction is not the undo-root of itself, then at step 384 it is determined whether the parent of the failed transaction should be undone. Step 384 is performed in an iterative manner to find the undo-root for the failed transaction.

For purposes of the description to follow it is worth noting the difference between a transaction that commits to an ancestor transaction, such as a scoped transaction that commits to its ancestor, and a transaction that is a child of that ancestor transaction. The inherent properties of parent-child relationship can be expressed in terms of inter-transaction dependencies. An instance of a transaction undergoes state transition at run time. The transaction activates in the start state from which it exists by either reaching the end of its work or a failure. Accordingly, the transaction terminates either in the commit state or in the abort state. A child transaction is "vital" if its failure causes its parent transaction to abort.

The relationship between a parent transaction and a child transaction includes the following dependencies which are enforced by the routines of the process execution unit 70.

A child transaction has a start dependency on it parent transaction. For example, the transaction 228 cannot start until the transaction 224 has started.

A parent transaction has terminate dependency on in its child transaction. For example, the transaction 224 cannot terminate until the transactions 228 and 230 have terminated.

A child transaction has an abort/compensate dependency on its parent transaction. For example, if the transaction 222 aborts, then the transaction 224 and its child transactions 228 and 230 are either aborted or a compensation operation for them is performed.

If a child transaction is predefined as being vital to it parent transaction, then the failure of the child transaction causes the parent transaction to fail. If a child transaction is predefined as being non-vital to it parent transaction, then the failure of the child transaction may be ignored by the parent transaction.

Any data object held in the access-set of a parent transaction is visible to a child transaction such that the child transaction can invoke operations on the data objects held in the access-set of the parent transaction without conflicts with the parent transaction. For example, the transaction 226 can invoke operations on the data objects in the access set of the transaction 222 without conflicts with the transaction 222.

Although a closed child transaction has a commit dependency on its parent in a transaction hierarchy, such dependency is not essential to parent-child relationship. A scoped transaction in a transaction hierarchy provides commit dependencies that do not coincide with the parent child relationship.

The fact that the child transaction 228 can commit to its ancestor transaction 222 independently of its parent transaction 224 does not change the dependencies between the parent and child transactions 224 and 228. For example, the parent transaction 224 cannot terminate before the child transaction 228 terminates. In addition, the child transaction 228 does not survive the abort of it parent transaction 224. If the parent-child relationship is not maintained, then a child transaction and its siblings may not be processed at the same level either in normal progress or in failure recovering, which can lead to inconsistencies with the semantics of the modeled application.

Figure 5:
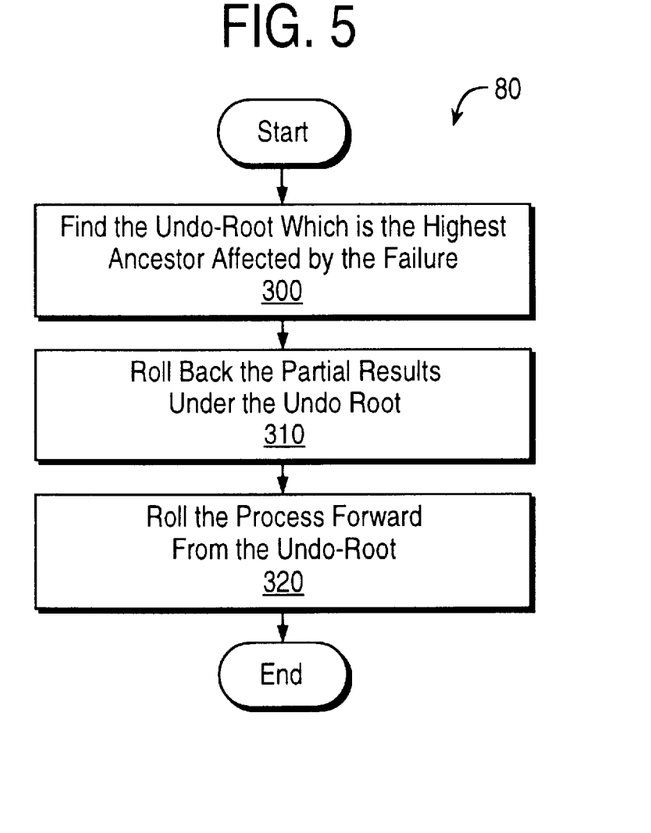
FIG. 5 illustrates a failure handling routine for transaction hierarchies that include scoped transactions.

FIG. 5 illustrates the process for failure handling 80. At step 300, the highest ancestor in the process hierarchy that is affected by the failure is found. The highest ancestor affected by the failure is referred to as the undo-root. The undo root is the closest ancestor of the failed transaction that is non-vital or that is associated with a contingency transaction which acts as an exception handler for the failed transaction.

The undo-root of a scoped transaction is the closest ancestor of the scoped transaction that does not kill its own parent transaction upon failure. In addition, the undo-root of a scoped transaction may be the closest ancestor having no parent transaction at all such as the top-level transaction 222 of the process 220, a contingency transaction, or a compensation transaction.

The path between the failed transaction and the undo-root defines an abort-up chain in the transaction hierarchy. Step 300 involves a bottom-up search of the transaction hierarchy 220 from the failed transaction which is conducted without actually applying any abort or compensation operations.

At step 310, the partial results under the undo-root found at step 300 are logically rolled back in what is referred to as a scoped-undo operation. The scoped-undo operation is conducted in a top-down fashion to roll back the transaction sub-tree under the undo-root. The top-down undo may involve compensation transactions according to the specifications contained in the transaction definition file 72.

During the scoped-undo operation, the transactions on each level of the transaction hierarchy that committed over the undo-root transaction are compensated if the effects of those transaction are not compensated for at a higher level. In-progress transactions or transactions that have tentatively committed to their parent transaction are aborted during the scoped-undo operation. In addition, committed child transactions of aborted transactions may be compensated during the scoped-undo operation. Sequential child transactions are processed in the inverse order.

At step 320, the failed information process is rolled forward from the undo-root. The rolling forward involves a top-down execution from the undo-root, possibly through an alternate path provided by contingency transactions.

The presence of scoped transactions in a transaction hierarchy may cause different pieces of the partial results of a transaction sub-tree to be visible in different scopes. As a consequence, the following rules are applied to ensure semantic consistencies when executing compensation transactions during a scoped-undo operation. First, a compensation transaction for a scoped transaction is also scoped with the same commit scope of the scoped transaction being compensated. For example, when a seminar announcement is made accessible in a department, the seminar cancellation notification should be made accessible in the same department, rather than in a smaller or a larger scope. In addition, certain restrictions defined hereinafter by confine and cap properties of scoped transaction are applied. The confine and cap properties allow the effects of open or scoped transactions and the scopes of those effects to be determined without ambiguity.

A compensation transaction executed during a scoped-undo operation can logically undo the effects of a failed scoped transaction in a scope that matches commit scope of the failed scoped transaction. For example, a scoped hotel reservation transaction may be paired with a scoped reservation cancel transaction that compensates for the failed hotel reservation transaction. A contingency or compensation transaction associated with a scoped transaction may be a flat transaction or hierarchy of transactions that may be structured differently from the scoped transaction. As transactions are parameterized, appropriate information can be passed from the instance of a transaction to the instances of its compensation and contingency transactions.

The scoped-undo operation provides effective response to failures in the following aspects. The scoped-undo operation performs the compensation for a transaction at the highest possible level. For example, when an organize seminar transaction is directly compensated for by a cancel-seminar transaction, the collective effects of the organize seminar transaction are eliminated regardless of its internal steps. Secondly, the scoped-undo operation provides timely response to a failure by halting the transaction sub-tree affected by the failure promptly from its root in the transaction hierarchy.

Without the confine property described below, the execution of a compensation transaction with opposite effects to a failed transaction may lead to over-compensation if the failed transaction is nested and partially done with not all of its child transactions committed. On the other hand, the execution of a compensation transaction with opposite effects to a transaction may lead to under-compensation without the confine property if the transaction is open or scoped and has data objects inherited from its ancestors.

An open or scoped transaction satisfies the confine property if the transaction holds only locally controlled data objects and commits only the locally controlled data objects. Locally controlled data objects are data objects acquired directly from an information store and not inherited data objects.

The access-set of a transaction includes a locally controlled access-set that is acquired from an information stores directly by the transaction and the descendants of the transaction. The access-set of a transaction also includes the access-set passed to the transaction from its parent. A confined open transaction commits to an information store only the locally controlled access set. A confined scoped transaction commits to a non-parent ancestor transaction only the locally controlled access set.

A nested transaction may be a confined open transaction that commits to an information store. A nested transaction may be a confined scoped transaction that commits to an ancestor transaction. In addition, a nested transaction may be a transaction that commits to its parent transaction.

Figure 6:
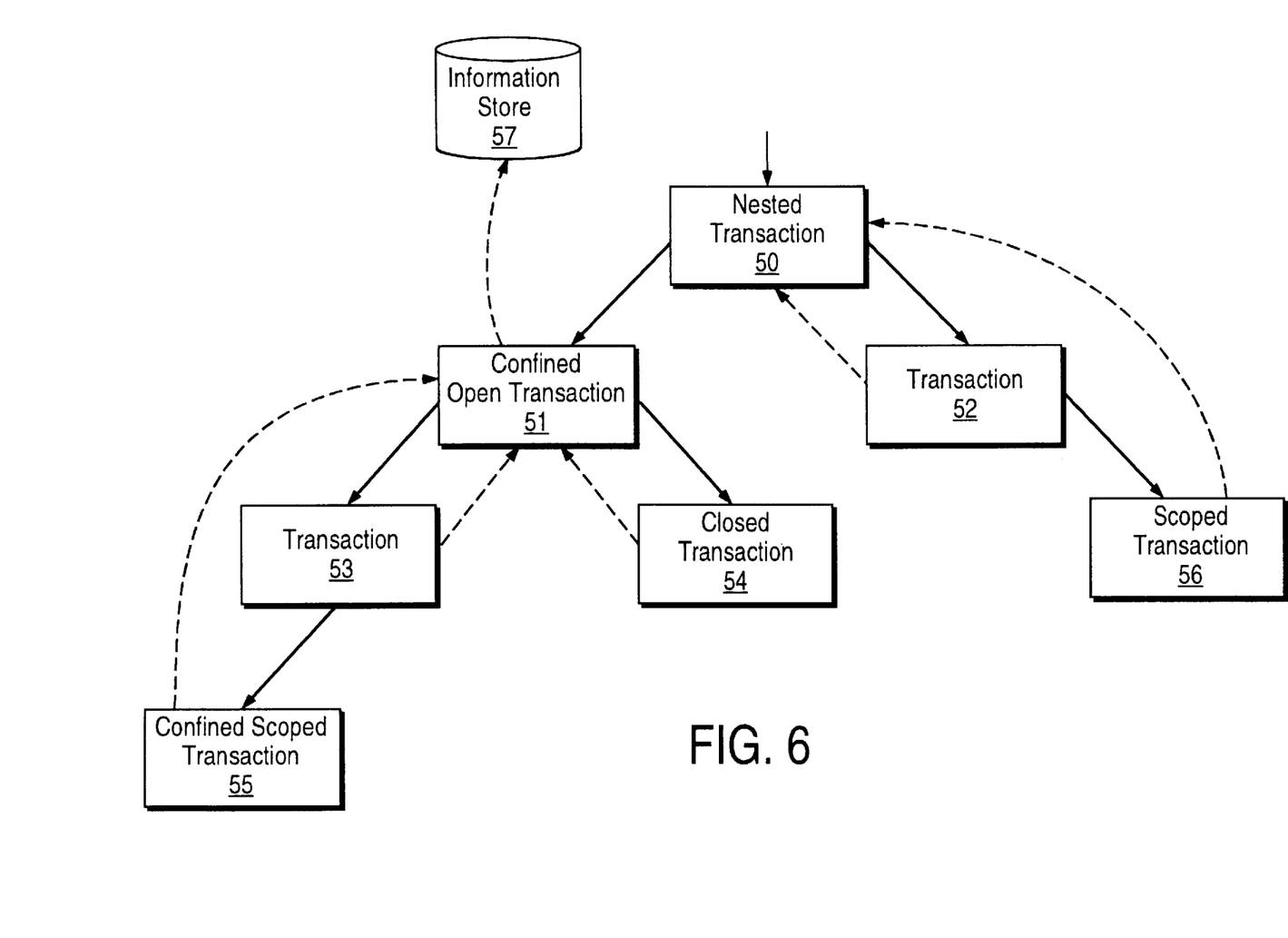
FIG. 6 illustrates an assortment of access-set inheritance paths and commit scopes for nested transactions.

FIG. 6 illustrates an assortment of access-set inheritance paths and commit scopes for nested transactions. A set of nested transaction 50–55 is shown wherein the solid lines indicate inheritance paths and dashed lines indicate commit paths in the transaction hierarchy. All of the transactions 50–55 can acquire data objects from an information store 57.

The transaction 54 is a closed transaction that inherits data objects from its parent transaction 51 and that commits to its parent transaction 51. The transaction 51 is a confined open transaction that commits to the information store 57. In addition to the closed child transaction 54, the transaction 51 includes a scoped child transaction 55. The confined scoped transaction 55 commits to the transaction 51. The confined scoped transaction 56 commits to the transaction 50. The nested transaction 50 has sub-transactions with mixed commit scopes and can inherit objects from and commit to its own parent transaction (not shown).

Figure 7A:
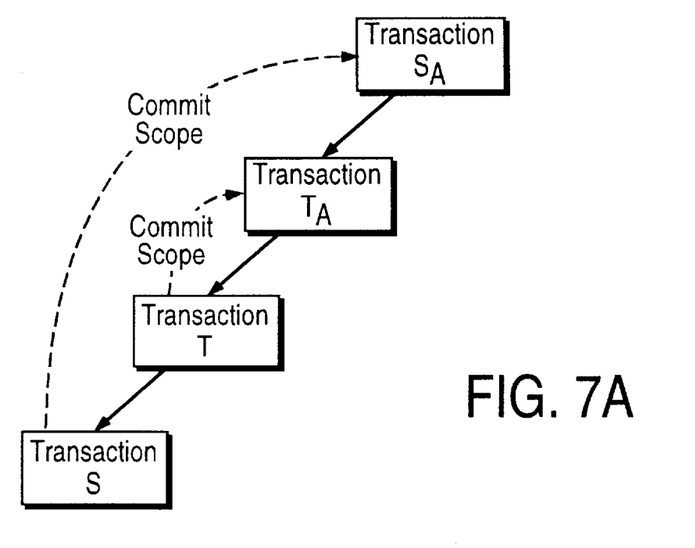
FIGS. 7a–7b illustrate the failure handling problems avoided by the cap property of open and scoped transactions.
Figure 7B:
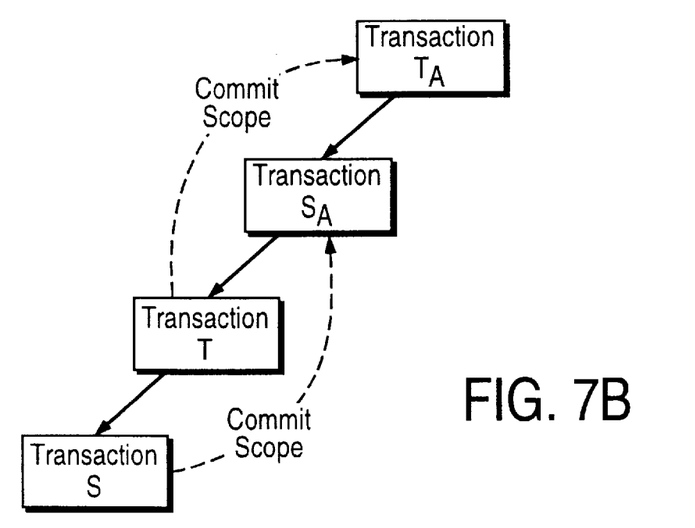

FIGS. 7a–7b illustrate the problems avoided by the cap property of scoped transactions. The transaction T is a scoped transaction which commits to its ancestor transaction $T_A$. The transaction T is associated with a compensation transaction T1 (not shown). The transaction T has a descendant transaction S which commits over the transaction T to the transaction $S_A$.

FIG. 7a shows the problems of compensating the effects of the transaction T by executing the compensation transaction T1 when the transaction $T_A$ is a child of the transaction $S_A$. If the commit scope of the compensation transaction T1 is the transaction $T_A$, then the effects of the transaction T are under-compensated since the effects of the transaction S are compensated in a smaller scope than the commit scope of the transaction S. If the commit scope of the transaction T is the transaction $S_A$, the effects of the transaction T are over-compensated since effects other than those of the transaction S are compensated in a larger scope than the commit scope of the transaction T.

FIG. 7b shows the problems of compensating the effects of the transaction T by executing the compensation transaction T1 when the transaction $S_A$ is a child of the transaction $T_A$. If the commit scope of compensation transaction T1 is the transaction $T_A$, then the effects of the transaction T are over-compensated since the effects of the transaction S are compensated in a larger scope than the commit scope of the transaction S. If the commit scope of the compensation transaction T1 is the transaction $S_A$, then the effects of transaction T are under-compensated since effects other than those of the transaction S are compensated in a smaller scope than the commit scope of the transaction T.

The cap property which applies to open or scoped transactions avoids the problems shown in FIGS. 7a–7b. The cap property refers to a restriction that an open or scoped transaction may not have descendants committing over it. With this restriction, the compensation scope of a scoped transaction can be chosen as one that matches its commit scope.

Although an open or scoped transaction may not have open or scoped sub-transactions committing over it, it may have closed sub-transactions or scoped sub-transactions that do not commit over it. Further, a nested transaction containing open or scoped sub-transactions is not necessarily an open or scoped transaction, and is not restricted by the above cap property. For example, a nested transaction that is not open or scoped itself is allowed to have all its child transactions committing over it to the information store. Thus, failure handling for the effects of the nested transaction may be compensated for at the level of the nested transaction or at its child level.

Given the confine and cap properties described above, the compensation scopes in a transaction hierarchy are as follows. When a transaction $T_f$ in a transaction tree fails, the sub-tree under its undo-root transaction $T_{ur}$ is logically undone. Compensation is performed for transactions under the transaction $T_{ur}$ that have committed over the transaction $T_{ur}$. Compensation is unnecessary for transactions that have committed to a transaction under the transaction $T_{ur}$. In addition, compensation may be unnecessary for transactions that have committed to a transaction under the transaction $T_{ur}$ because the compensation is covered by the compensation applied to some ancestor of the transactions.

For example, assume a transaction T is a transaction under the transaction $T_{ur}$ that previously committed to an ancestor transaction $T_A$ and that needs to be logically undone. The elimination of the effects of the transaction T depends on whether the transaction T has committed over the transaction $T_{ur}$ since only in that case do the effects of the transaction T need to be explicitly eliminated by scoped compensation. According to the terminate dependency between a parent and a child transaction, transitively, any direct ancestors of the failed transaction $T_f$ may not commit prior to the failure of the transaction $T_f$.

If the transaction $T_{ur}$ is a child of the transaction $T_A$ or if the transaction $T_A$ is not the undo-root $T_{ur}$, then the transaction T is compensated with the scope of the transaction $T_A$ to eliminate the effects of T. The transaction $T_A$ may not commit prior to the failure of the transaction $T_f$.

If the transaction $T_A$ is the undo-root transaction $T_{ur}$, then the transaction T can be aborted without compensation because the transaction $T_{ur}$ may not commit prior to the failure of $T_f$.

If the transaction $T_A$ is uncommitted and is a child of the undo-root transaction $T_{ur}$, then the transaction T can be aborted without compensation.

The application of a scoped-undo operation on a transaction hierarchy T is based on its instance execution history. The expression $T{:}{<}T_1, \ldots, T_n{>}$ represents a list of child transactions $T_1, \ldots, T_n$ which are executed sequentially. The expression $T{:}\{T_1, \ldots, T_n\}$ represents a set of child transactions $T_1, \ldots, T_n$ which are executed concurrently.

During a scoped-undo operation, the function scoped-undo$_{sub}$ is used to logically undo the sub-transactions at the child level of a given transaction. The function scoped-undo$_{sub}$ is invoked by the scoped-undo function shown below and iteratively invokes the scoped-undo function for accomplishing hierarchical logical undoing. When the sub-transactions form a sequence, the scoped-undo operations are performed in the inverse order.

scoped-undo$_{sub}$ (T)=T:$<T_1, \ldots, T_n>\rightarrow{<}$scoped-undo $(T_n), \ldots$ scoped-undo $(T_1){>}$; $T{:}\{T_1, \ldots, T_n\}\rightarrow\{$scoped-undo$(T_1), \ldots$ scoped-undo$(T_n)\}$;

A nested transaction having confined open or scoped sub-transactions still may commit to its parent. The following special cases are given special treatments: for a nested transaction with all its child transactions committing to the information store—the database is considered as its commit scope; and for a nested transaction with all its child transactions committing to the same ancestor, that ancestor is considered as its commit scope. These special treatments allow such a nested transaction to be compensated either at the same level or at the child level.

The expression $p_1{\rightarrow}f_1; \ldots; p_n{\rightarrow}f_n; f_{n+1}$ denotes function form "if $P_1$ then $f_1; \ldots$ ;else if $p_n$ then $f_n$; else $f_{n+1}$." The symbols $T^{com}$ and $T^{ctg}$ represent the compensation and contingency transactions associated with a transaction hierarchy T. The term nested(T) indicates a nested rather than a flat or leaf-level transaction.

The expression $T_{\rightarrow is}$ represents a commit to information store operation. The expression $T_{\rightarrow A}$ represents a commit to ancestor transaction A operation. The expression $\xi(T)$ denotes the execution status of T, with values committed, executing, aborted, idle, etc. $\sigma(T)$ denotes the commit scope of T, for example the information store or an ancestor transaction of T. The expression T<A indicates that T is a child of A.

The scoped-undo operation which is performed at step 320 of the process for failure handling 80 is defined by the following:

```
scoped-undo (T) =
    ξ (T) ==idle → nil;
    ξ (T) ==executing → (
        nested (T) → scoped-undo_sub (T);
        abort (T));
    ξ (T) ==aborted → (
        executed (T^ctg) → scoped-undo (T^ctg);
        nil);
    ξ (T) ==committed → (
        σ (T) ==information store → (
            compensate-defined (T) → exec (T^com_→is);
            nested (T) → scoped-undo_sub (T);
            nil);
        σ (T) ==A ∧ ur (T) < A ∧ A ≠ ur (T) → (
            compensate-defined (T) → exec (T^com_→A);
            nested (T) → scoped-undo_sub (T);
            nil);
        nested (T) → scoped-undo_sub (T);
        nil);
```

Figure 8:
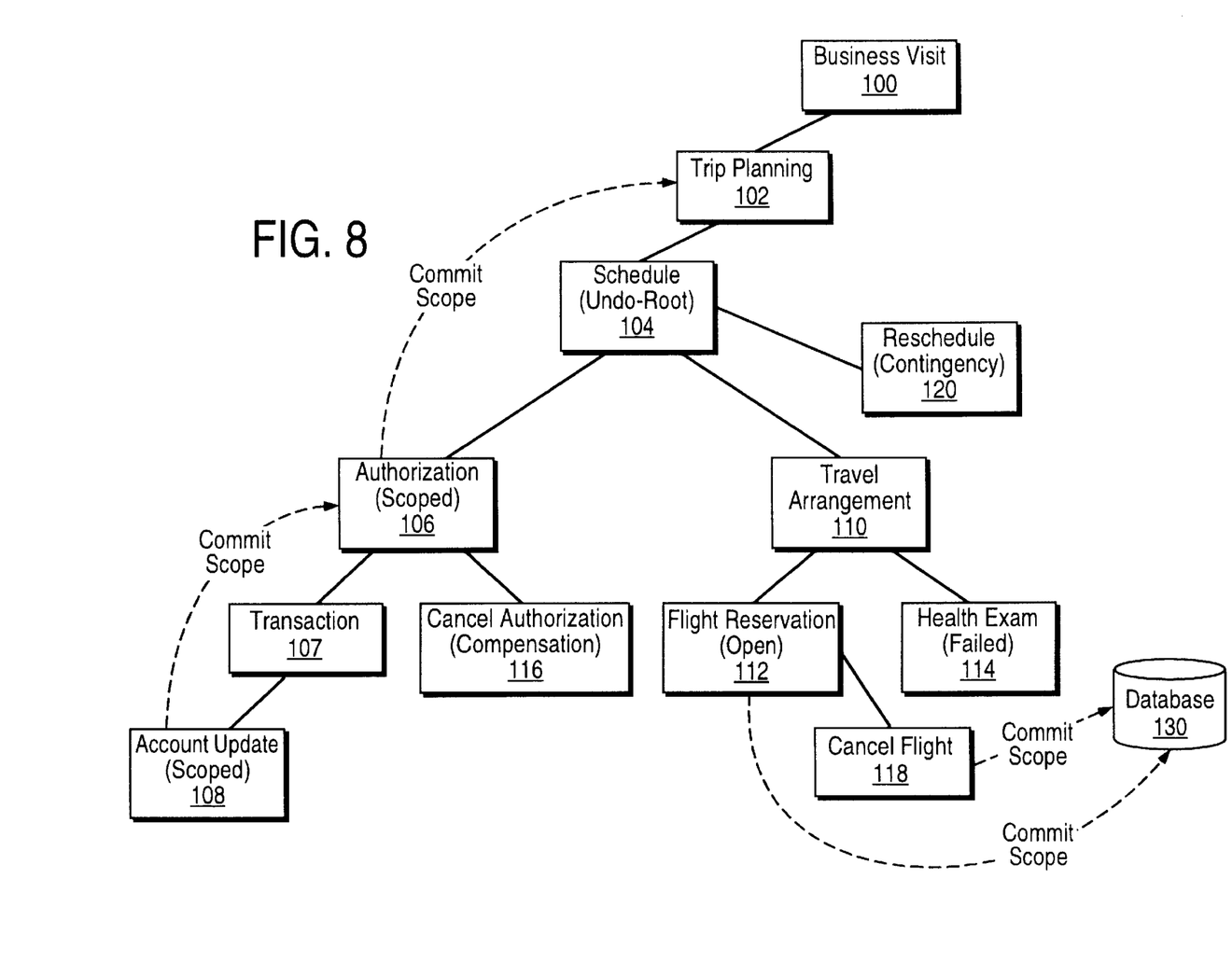
FIG. 8 illustrates the failure handling routine for transaction hierarchies that include scoped transactions applied to an example information process.

FIG. 8 illustrates the process for failure handling 80 applied to a business visit process 100. The business visit process 100 is arranged as a transaction tree with a trip-planning transaction 102 as a child transaction and a schedule transaction 104 as a grand-child transaction. The schedule transaction 104 is further divided into an authorization transaction 106 and a travel arrangement transaction 110 which are executed in parallel.

An account update transaction 108 is a scoped transaction which commits over its parent transaction 107 to the authorization transaction 106. The authorization transaction 106 is also a scoped transaction which commits over its parent schedule transaction 104 to the trip planning transaction 102. A flight reservation transaction 112 is an open child transaction of the travel arrangement transaction 110.

A health exam transaction 114 which is a child of the travel arrangement transaction 110 has failed. The undo-root of the failed health exam transaction 114 is the schedule transaction 104. The failure of the health exam transaction 114 causes the travel arrangement transaction 110 to fail, and the failure of the travel arrangement transaction 110 causes the schedule transaction 104 to fail in an abort-up causal chain. The schedule transaction 104 is associated with a reschedule transaction 120 which is a contingency transaction. Therefore, the schedule transaction 104 qualifies as an undo-root. The schedule transaction 104 would also qualify as an undo-root if it were non-vital to its parent transaction 102 as indicated by the specifications of the transaction 104 which are contained in the transaction definition file 72.

The open flight reservation transaction 112, which is a sibling of the failed health exam transaction 114 has already committed to an airline reservation database 130 at the time the health exam transaction 114 fails. The travel arrangement transaction 110, the parent of the failed health exam transaction 114, is a sibling of the authorization transaction 106 which is a scoped transaction that already has committed over its parent schedule transaction 104 to the trip planning transaction 102 at the time the health exam transaction fails. In addition, the account update transaction 108 is a scoped transaction that has committed to the authorization transaction 106 before the authorization transaction 106 committed to the trip planning transaction 102.

During the scoped-undo operation, the open flight reservation transaction 112 is compensated for by a cancel flight transaction 118 which removes the reservation committed by the flight reservation transaction 112 from the airline reservation information store 130. The scoped authorization transaction 106 is compensated for in the scope of the trip planning transaction 102. Since the scoped account update transaction 108 only committed to the authorization transaction 106, its effects are still internal to the authorization transaction 106 are eliminated along with the compensation of the authorization transaction 106.

Upon failure of the health exam transaction 114, its undo-root, the schedule transaction 104, is searched for first without actually performing scoped undo in accordance with step 300 of the process for failure handling 80. Thereafter, the sub-transaction trees under the undo-root transaction 104, one of which is rooted by the authorization transaction 106 and another of which is rooted by the travel arrangement transaction 110 are applied with a scoped undo operation in parallel in accordance with step 310 of the process for failure handling 80. After the completion of parallel scoped-undo operations, the business visit process 100 rolls forward with the execution of the contingency reschedule transaction 120 in accordance with step 320 of the process for failure handling 80.

The techniques disclosed herein provide an integrated approach for handling failures in transaction hierarchies where closed, open and scoped transactions coexist.

A variety of mechanisms may be employed by the process execution unit 70 to delegate data objects and commit data objects to transactions within a hierarchy. In one embodiment, the data objects in the access set or visibility set of a transaction may be contained in a data table for that transaction in a database. The descendant transactions that inherit data objects from an ancestor transaction are provided with data locks for the data tables of the ancestor transaction by the process execution unit 70. The descendant transactions may use SQL statements to read data from or write data updates to the inherited data objects.

In another embodiment, the data objects for a transaction may be contained in a file. The descendant transactions of the transaction are allowed access to the file when they inherit the data set. The process execution unit 70 controls access to the file and passes "keys" to the file during the start-transaction and complete-transaction functions. Data updates from a descendant transaction may be written to an update log file for a data object file when the child transaction commits to the parent transaction.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An information system, comprising:

information process arranged as a hierarchy of nested transactions wherein at least one of the nested transactions is a scoped transaction that generates a set of data updates;

routine that handles the completion of the scoped transaction by committing the data updates generated by the scoped transaction to an ancestor transaction of the scoped transaction such that the data updates are visible to one or more descendant transactions of the ancestor transaction before the ancestor transaction completes.

2. The information system of claim 1, further comprising a routine for handling a failure in the information process by performing the steps of:

performing a bottom-up search of the hierarchy to find an undo-root transaction which is a highest one of the nested transactions affected by the failure;

compensating for any data updates committed over the undo-root transaction by the scoped transaction;

aborting any data updates generated by the transactions below the undo-root transaction in the hierarchy.

3. The information system of claim 2, wherein the undo-root transaction is a closest ancestor to a failed transaction that is non-vital to its parent transaction.

4. The information system of claim 2, wherein the undo-root transaction is a closest ancestor to a failed transaction that is associated with a contingency transaction.

5. The information system of claim 2, wherein the undo-root transaction is a closest ancestor to a failed transaction that does not have a parent transaction in the hierarchy.

6. The information system of claim 2, wherein the step of compensating includes the step of executing a compensation transaction that commits to the ancestor transaction of the scoped transaction.

7. The information system of claim 1, wherein the scoped transaction is a confined transaction such that the data updates committed by the confined transaction are targeted for data objects acquired directly from an information store by the confined transaction.

8. The information system of claim 7, further comprising a routine for handling a failure in the information process by performing the steps of:

performing a bottom-up search of the hierarchy to find an undo-root transaction which is a highest one of the nested transactions affected by the failure;

compensating for any data updates committed over the undo-root transaction by the confined transaction;

aborting any data updates generated by the transactions below the undo-root transaction in the hierarchy.

9. The information system of claim 1, wherein the scoped transaction is a capped transaction such that the capped transaction has no child transactions that commit over the capped transaction.

10. The information system of claim 9, further comprising a routine for handling a failure in the information process by performing the steps of:

performing a bottom-up search of the hierarchy to find an undo-root transaction which is a highest one of the nested transactions affected by the failure;

compensating for any data updates committed over the undo-root transaction by the capped transaction;

aborting any data updates generated by the transactions below the undo-root transaction in the hierarchy.

11. A method for handling a failed transaction in a hierarchy of nested transactions that includes at least one scoped transaction, comprising the steps of:

searching the hierarchy to find an undo-root transaction which is a highest one of the nested transactions affected by the failure;

compensating for any data updates previously committed over the undo-root transaction by the scoped transaction to an ancestor transaction of the scoped transaction such that the data updates are visible to one or more descendant transactions of the ancestor transaction before the ancestor transaction completes;

aborting any data updates generated by the transactions below the undo-root transaction in the hierarchy.

12. The method of claim 11, wherein the step of searching comprises the step of searching upward from a bottom of the hierarchy.

13. The method of claim 11, wherein the step of searching comprises the step of searching for a closest ancestor to the failed transaction that is non-vital to its parent transaction.

14. The method of claim 11, wherein the step of searching comprises the step of searching for a closest ancestor to the failed transaction that is associated with a contingency transaction.

15. The method of claim 11, wherein the step of searching comprises the step of searching for a closest ancestor to the failed transaction that does not have a parent transaction in the hierarchy.

16. The method of claim 11, wherein the step of compensating includes the step of executing a compensation transaction that commits to the ancestor transaction of the scoped transaction.

17. The method of claim 11, wherein the scoped transaction is a confined transaction such that the data updates committed by the confined transaction are targeted for data objects acquired directly from an information store by the confined transaction.

18. The method of claim 11, wherein the scoped transaction is a capped transaction such that the capped transaction has no child transactions that commit over the capped transaction.

* * * * *